United States Patent
Bales et al.

(10) Patent No.: US 10,148,340 B1
(45) Date of Patent: Dec. 4, 2018

(54) MULTI-CORE COMMUNICATION SYSTEM TO SERVE WIRELESS RELAYS AND USER EQUIPMENT

(71) Applicant: Sprint Communications Company L.P., Overland Park, KS (US)

(72) Inventors: Mark Richard Bales, Lee's Summit, MO (US); Lyle T. Bertz, Lee's Summit, MO (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 15/084,759

(22) Filed: Mar. 30, 2016

(51) Int. Cl.
| | |
|---|---|
| *H04W 76/25* | (2018.01) |
| *H04B 7/155* | (2006.01) |
| *H04M 15/00* | (2006.01) |
| *H04W 60/00* | (2009.01) |
| *H04W 28/02* | (2009.01) |
| *H04W 76/10* | (2018.01) |
| *H04W 88/16* | (2009.01) |

(52) U.S. Cl.
CPC ........ *H04B 7/15507* (2013.01); *H04M 15/66* (2013.01); *H04W 28/0268* (2013.01); *H04W 60/00* (2013.01); *H04W 76/10* (2018.02); *H04W 76/25* (2018.02); *H04W 88/16* (2013.01)

(58) Field of Classification Search
CPC .................................................... H04W 76/25
USPC ........................................................ 370/315
See application file for complete search history.

(56) References Cited

U.S. PATENT DOCUMENTS

| | | | |
|---|---|---|---|
| 8,259,637 B2 | 9/2012 | Bertrand et al. | |
| 8,509,214 B2 | 8/2013 | Liu et al. | |
| 8,761,073 B2 | 6/2014 | Liu et al. | |
| 8,797,940 B2 | 8/2014 | Racz et al. | |
| 9,019,841 B2 | 4/2015 | Tavildar et al. | |
| 9,036,533 B2 | 5/2015 | Liu et al. | |
| 9,077,430 B2 | 7/2015 | Han et al. | |
| 9,083,517 B2 | 7/2015 | Chen et al. | |
| 2007/0238461 A1* | 10/2007 | Lundin | H04W 8/12 455/436 |
| 2010/0046418 A1* | 2/2010 | Horn | H04W 40/22 370/315 |
| 2010/0202343 A1* | 8/2010 | Hunzinger | H04B 7/155 370/315 |

(Continued)

FOREIGN PATENT DOCUMENTS

| | | | | |
|---|---|---|---|---|
| EP | 2369892 A1 * | 9/2011 | ............. | H04B 7/155 |
| WO | WO-2005039213 A1 * | 4/2005 | ............ | H04W 60/00 |

*Primary Examiner* — Andrew Lai
*Assistant Examiner* — Jamaal R Henson

(57) ABSTRACT

A multi-core data communication system serves a wireless relay from a relay core and serves User Equipment (UE) from a UE core. The relay core establishes a relay bearer between the relay and the relay core over a wireless base station. The relay receives a data request from the UE and transfers a UE data request to the UE core indicating a UE ID, a Relay ID, and a Relay Core ID. The UE core receives the UE data request and responsively transfers a core-to-core message indicating the Relay ID to the relay core. The relay core receives the core-to-core message and directs the base station to modify the relay bearer. The UE and the UE core exchange user data over a UE bearer that traverses the modified relay bearer.

18 Claims, 9 Drawing Sheets

(56) References Cited

U.S. PATENT DOCUMENTS

| | | | |
|---|---|---|---|
| 2011/0208842 A1* | 8/2011 | Mildh | H04B 7/155 709/220 |
| 2013/0258943 A1* | 10/2013 | Madaiah | H04W 72/04 370/315 |
| 2014/0135008 A1* | 5/2014 | Yu | H04W 36/0077 455/436 |
| 2014/0301370 A1 | 10/2014 | Sivavakeesar | |

* cited by examiner

MULTI-CORE COMMUNICATION SYSTEM TO SERVE WIRELESS RELAYS AND USER EQUIPMENT

TECHNICAL BACKGROUND

Data communication systems exchange user data to provide various services like media streaming, audio/video conferencing, data messaging, and internet access. The data communication systems use several communication networks to transfer the user data. In particular, the data communication systems use wireless networks to provide mobile and/or convenient access to their data services. Exemplary wireless communication protocols include Long Term Evolution (LTE) and Wireless Fidelity (WIFI). In wireless networks, the LTE and WIFI protocols typically carry the user data in Internet Protocol (IP) packets.

To implement wireless access, User Equipment (UE) and network base stations exchange wireless signals that transport user data and network signaling. The base stations communicate with a core network over backhaul links. The core network includes various gateways, control systems, and user databases. The core network interacts with the UEs and the wireless base stations to deliver data services at the appropriate quality.

To extend the wireless access, wireless relays are deployed between the UEs and the wireless base stations. The wireless relays exchange the user data and network signaling between the UEs and the network base stations. The wireless relays also generate and consume their own network signaling. To optimize wireless relay operations, separate network cores for wireless relays are installed. Thus, the wireless relays serve the UEs which are served from a UE network core, but the wireless relays are served from a different relay network core.

Unfortunately, current multi-core data communication systems are neither efficient nor effective when using wireless relays. In particular, the interactions between the multiple network cores, the wireless relays, and the UEs is not adequate to support complex services like voice and video.

TECHNICAL OVERVIEW

A multi-core data communication system serves a wireless relay from a relay core and serves User Equipment (UE) from a UE core. The relay core establishes a relay bearer between the relay and the relay core over a wireless base station. The relay receives a data request from the UE and transfers a UE data request to the UE core indicating a UE ID, a Relay ID, and a Relay Core ID. The UE core receives the UE data request and responsively transfers a core-to-core message indicating the Relay ID to the relay core. The relay core receives the core-to-core message and directs the base station to modify the relay bearer. The UE and the UE core exchange user data over a UE bearer that traverses the modified relay bearer.

DETAILED DESCRIPTION

Figure 1:
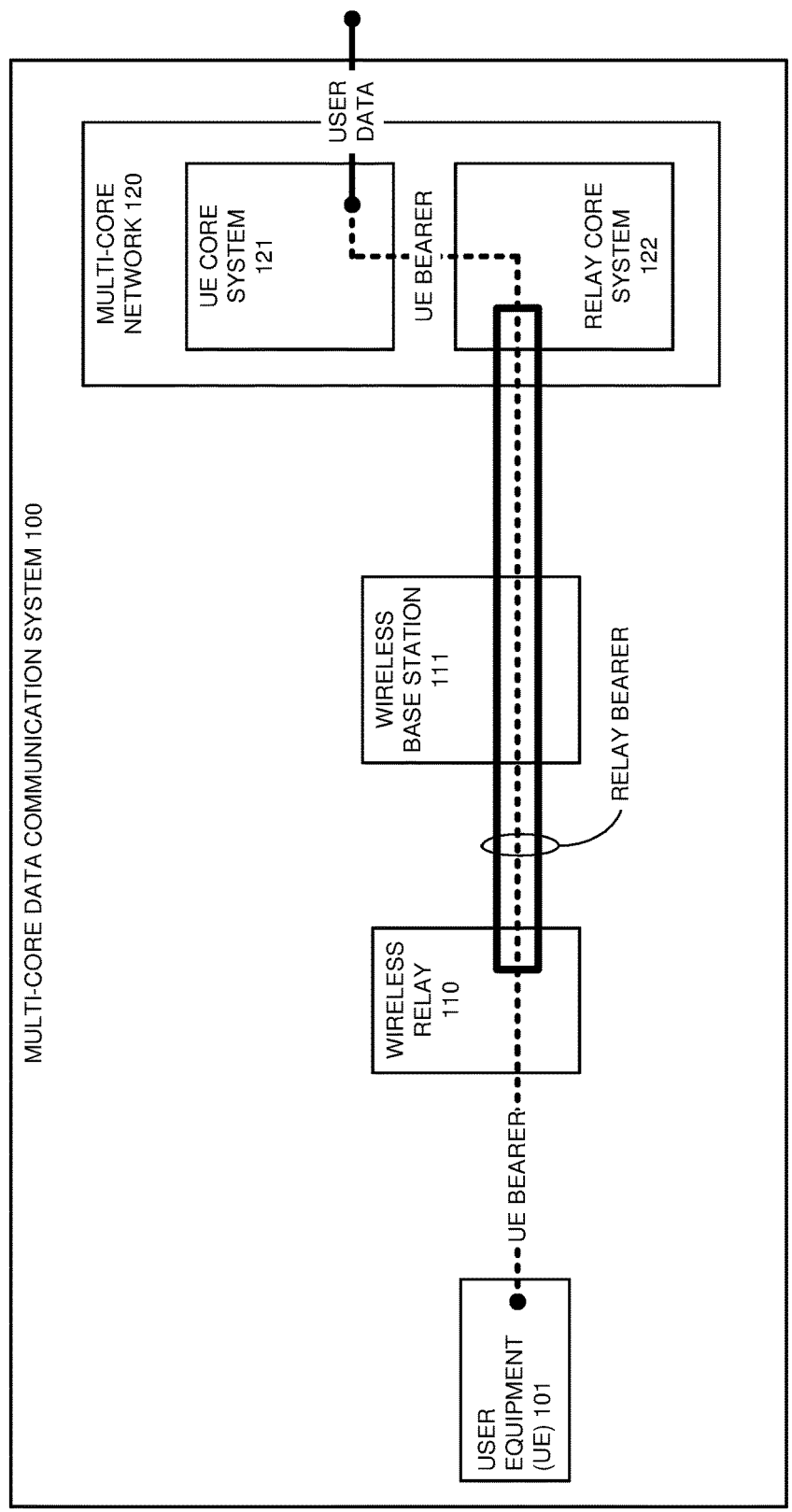
FIG. 1 illustrates a multi-core data communication system to serve wireless relays from a relay core system and to serve wireless User Equipment (UE) from a UE core system.

FIG. 1 illustrates multi-core data communication system 100 to serve wireless relay 110 from relay core system 122 and to serve wireless User Equipment (UE) 101 from UE core system 121. Multi-core data communication system 100 comprises: UE 101, wireless relay 110, wireless base station 111, and multi-core network 120. Multi-core network 120 comprises UE core system 121 and relay core system 122.

UE 101 comprises a phone, computer, server, or some other machine with an intelligent communication transceiver. Wireless base station 111 comprises a Long Term Evolution (LTE) evolved Node B (eNodeB), Wireless Fidelity (WIFI) hotspot, LTE/WIFI Aggregation (LWA) access point, or some other type of wireless data hub. Wireless relay 110 comprises base station components to interface with UE 101 and UE components to interface with wireless base station 111. UE core system 121 and relay core system 122 each comprise network gateways, routers, network controllers, user databases, and the like.

Initially, wireless relay 110 attaches to relay core system 122 over wireless base station 111. Relay core system 122 establishes a relay bearer between wireless relay 110 and relay core system 122 over wireless base station 111. In some examples, the relay bearer comprises a default LTE data bearer for wireless relay 110.

After relay attachment, UE 101 and wireless relay 110 exchange wireless attachment signaling. Wireless relay 110 responsively transfers a wireless attachment message over relay core system 122 to UE core system 121. The wireless attachment message indicates the UE ID, the Relay ID, and the Relay Core ID. UE core system 121 receives the wireless attachment message and establishes a UE bearer between UE 101 and UE core system 121. The UE bearer traverses the relay bearer between wireless relay 110 and relay core system 122. In some examples, the UE bearer comprises a default LTE data bearer for UE 101.

Wireless relay 110 eventually receives a wireless data request from UE 101. Wireless relay 110 responsively transfers a UE data request to UE core system 121. The UE data request indicates a UE Identifier (ID), a Relay ID, and a Relay Core ID. The UE ID and the relay ID may be International Mobile Subscriber Identifiers (IMSIs), International Mobile Equipment Identifiers (IMEIs), serial numbers, device names, network addresses, and the like. The relay core ID may be an Access Point Name (APN), relay network name, relay network address, and the like. For example, wireless relay 110 may transfer an S1-MME service request with the UE ID, Relay ID, and Relay Core ID to a Mobility Management Entity (MME) in UE core system 121. UE core system 121 receives the data request and modifies the UE bearer between UE 101 and wireless relay 110 and between UE core system 121 and relay core system 122.

In response to the data request, UE core system 121 transfers a core-to-core message indicating the Relay ID to relay core system 122. Relay core system 122 receives the core-to-core message. For example, a Policy Charging and Rules Function (PCRF) in UE core system 121 may transfer an S9 bearer instruction to a PCRF in relay core system 122 that indicates the UE and relay IMSIs and a Quality-of-Service Class Identifier (QCI) for the relay bearer. In response to the core-to-core message, relay core system 122 transfers a base station message that directs wireless base station 111 to modify the relay bearer between wireless relay 110 and relay core system 122. Relay core system 122 also modifies the relay bearer through its own gateways.

UE 101 and wireless relay 110 exchange user data over the modified UE bearer. Wireless relay 110 and wireless base station 111 exchange the user data over the UE bearer that traverses the modified relay bearer. Wireless base station 111 and relay core system 122 exchange the user data over the UE bearer that traverses the modified relay bearer. Relay core system 122 and UE core system 121 exchange the user data with over the modified UE bearer. UE core system 121 typically exchanges the user data with other core systems or with external systems.

Figure 2:
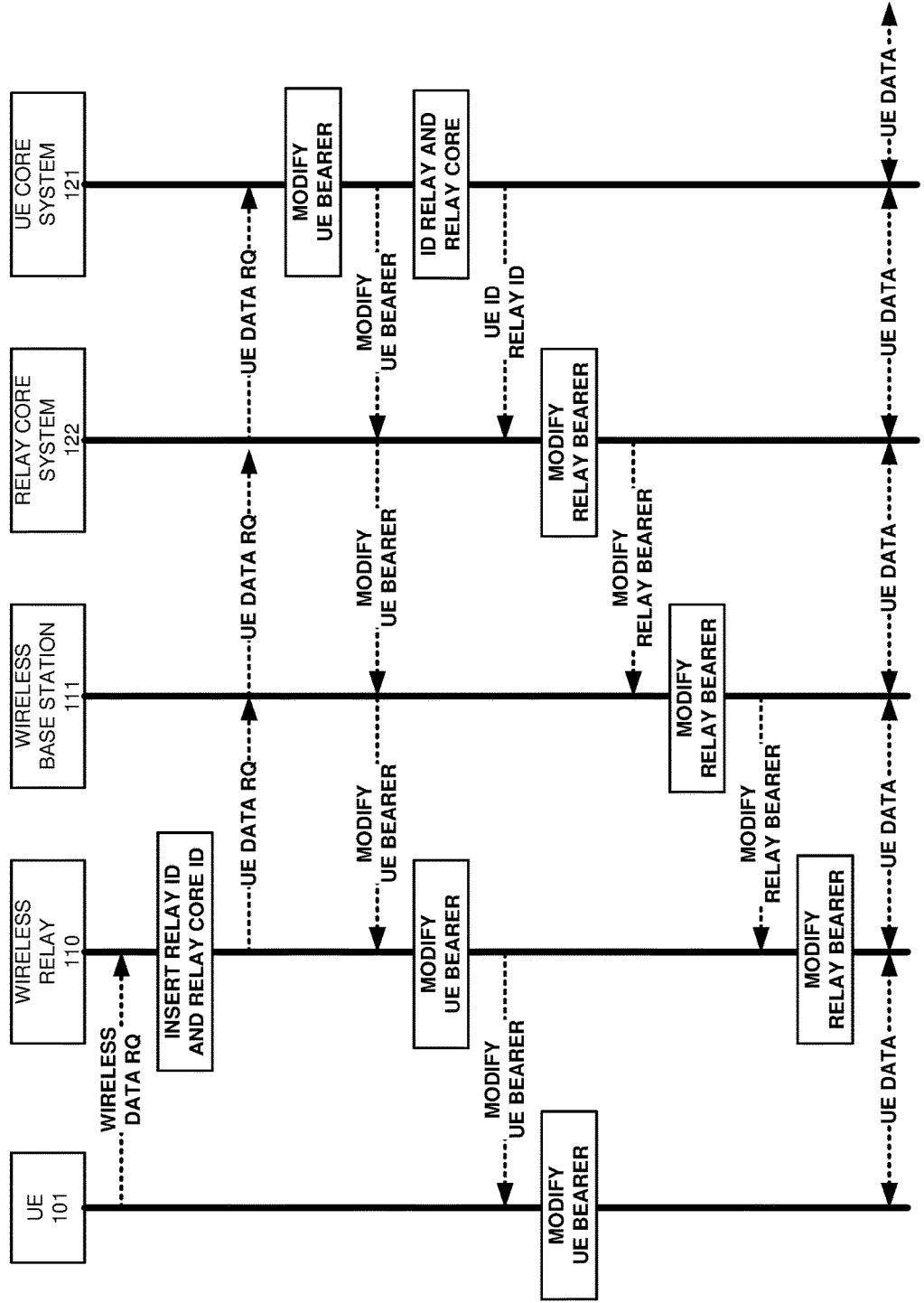
FIG. 2 illustrates the operation of the multi-core data communication system to serve a UE from a UE core system through a relay core system.

FIG. 2 illustrates the operation of multi-core data communication system 100 to serve UE 101 from UE core system 121 through relay core system 122. Wireless relay 110 receives a wireless data request from UE 101. Wireless relay 110 inserts a Relay ID and Relay Core ID into the signaling flow. Wireless relay 110 transfers a UE data request to UE core system 121 that indicates the UE ID, Relay ID, and Relay Core ID. The UE data request traverses wireless base station 111 and relay core system 122.

UE core system 121 receives the UE data request and modifies the UE bearer between core systems 121-122. UE core system 121 transfers a modify UE bearer instruction to wireless relay 110. The modify bearer instruction traverses relay core system 121 and wireless base station 111. Wireless relay 110 receives the modify UE bearer instruction, modifies the UE bearer, and transfers a UE message to UE 101 to modify the UE bearer. UE 101 receives the modify UE message and modifies the UE bearer.

UE core system 121 also identifies the Relay ID and the Relay Core ID in the UE data request. In response to these relay and core IDs, UE core system 121 transfers a core-to-core message indicating the UE ID and the Relay ID to relay core system 122. Relay core system 122 receives the core-to-core message and responsively modifies the relay bearer that serves the UE between wireless base station 111 and a relay core gateway. Relay core system 122 also responsively transfers a base station message that directs wireless base station 111 to modify the relay bearer. Wireless base station 111 receives the base station message, modifies the relay bearer, and transfers a UE message that directs wireless relay 110 to modify the relay bearer. Wireless relay 110 receives the UE message and modifies the relay bearer that serves UE 101.

UE 101 and wireless relay 110 exchange user data over the modified UE bearer. Wireless relay 110 and wireless base station 111 exchange the user data over the over the UE bearer that traverses the modified relay bearer. Wireless base station 111 and relay core system 122 exchange the user data over the UE bearer that traverses the modified relay bearer. Relay core system 122 and UE core system 121 exchange the user data over the modified UE bearer. UE core system 121 exchanges the user data with other systems.

Figure 3:
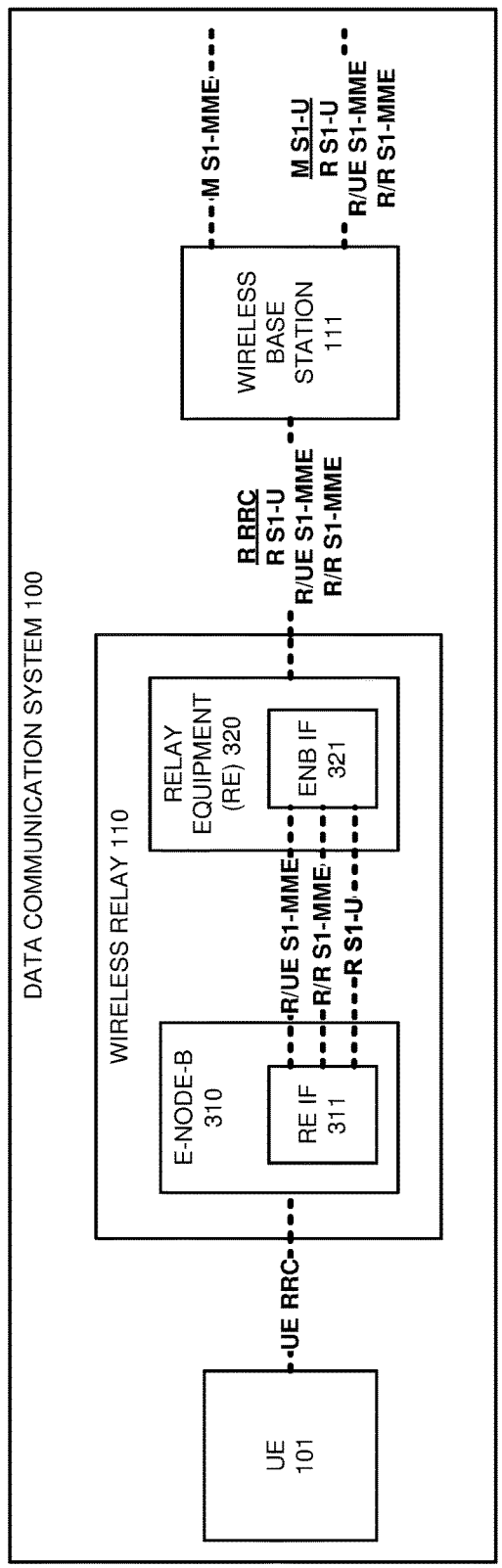
FIG. 3 illustrates a wireless relay to serve a UE from a UE core system through a relay core system.

FIG. 3 illustrates wireless relay 110 to serve UE 101 from UE core system 121 over relay core system 122. Wireless relay 110 comprises eNodeB 310 and Relay Equipment (RE) 320. eNodeB 310 has an RE Interface (IF), and RE 320 has an eNodeB (ENB) IF 321. RE 320 and ENB IF 321 exchange relay S1-MME signaling for UE core system 121 (R/UE S1-MME). RE 320 and ENB IF 321 exchange relay S1-MME signaling for relay core system 121 (R/R S1-MME). RE 320 and ENB IF 321 exchange user data over a relay link (R S1-U).

UE 101 and eNodeB 310 exchange wireless UE Radio Resource Control (UE RRC) signals that transport both user data and network signaling. In a like manner, RE 320 and wireless base station 111 exchange wireless relay RRC (R RRC) signals that transport both user data (R S1-U) and network signaling (S1-MME). The S1-MME signaling includes both Relay-to-Relay Core (R/R) and Relay-to-UE core (R/UE) S1-MME signaling. Wireless base station 111 and relay core system 122 exchange Macro S1-U (M S1-U) user data. The M S1-U data transports the R S1-U user data, R/UE S1-MME signaling, and R/R S1-MME signaling. Wireless base station 111 exchanges its own Macro S1-MME (M S1-MME) signaling with relay core system 122.

When RE 320 attaches to wireless base station 111, wireless base station 111 establishes a relay bearer over the R RRC/R S1-U and M S1-U/R S1-U links. These RRC and S1-U links may be the default LTE data bearer for RE 320. After RE attachment, UE 101 and eNodeB 310 exchange UE RRC attachment signals. eNodeB 310 responsively transfers a R/UE S1-MME attachment message to UE core system 121. The R/UE S1-MME message indicates the UE ID, Relay ID, and Relay Core ID. The resulting UE bearer between UE 101 and UE core system 121 traverses the UE RRC, R RRC/R S1-U, and M S1-U/R S1-U links. The UE bearer may comprise a default LTE data bearer for UE 101.

After UE attachment, eNodeB 310 receives a wireless data request from UE 101. eNodeB 310 responsively transfers a R/UE S1-MME service request to UE core system 121. The R/UE S1-MME service request indicates the UE ID, Relay ID, and Relay Core ID. An R/UE S1-MME service instruction from UE core system 121 to eNodeB 310 modifies the UE bearer over the UE RRC link to UE 101. An M S1-MME instruction from relay core system 121 to wireless base station 111 modifies the relay bearer (R S1-U) that traverses the R RRC link to RE 320 and the M S1-U link to relay core system 122. RE IF 311 and ENB IF 321 modify the UE bearer (R S1-U) and insert the modified UE bearer from UE 101 into the modified relay bearer (R RRC) for RE 320.

UE 101 and eNodeB 310 exchange user data over the modified UE bearer (UE RRC). eNodeB 310 and RE 320 exchange the user data over the modified UE bearer (R S1-U). RE 320 and wireless base station 111 exchange the user data over the modified relay bearer (R RRC/R S1-U). Wireless base station 111 and relay core system 122 exchange the user data over the modified UE bearer (M S1-U/R S1-U).

Figure 4:
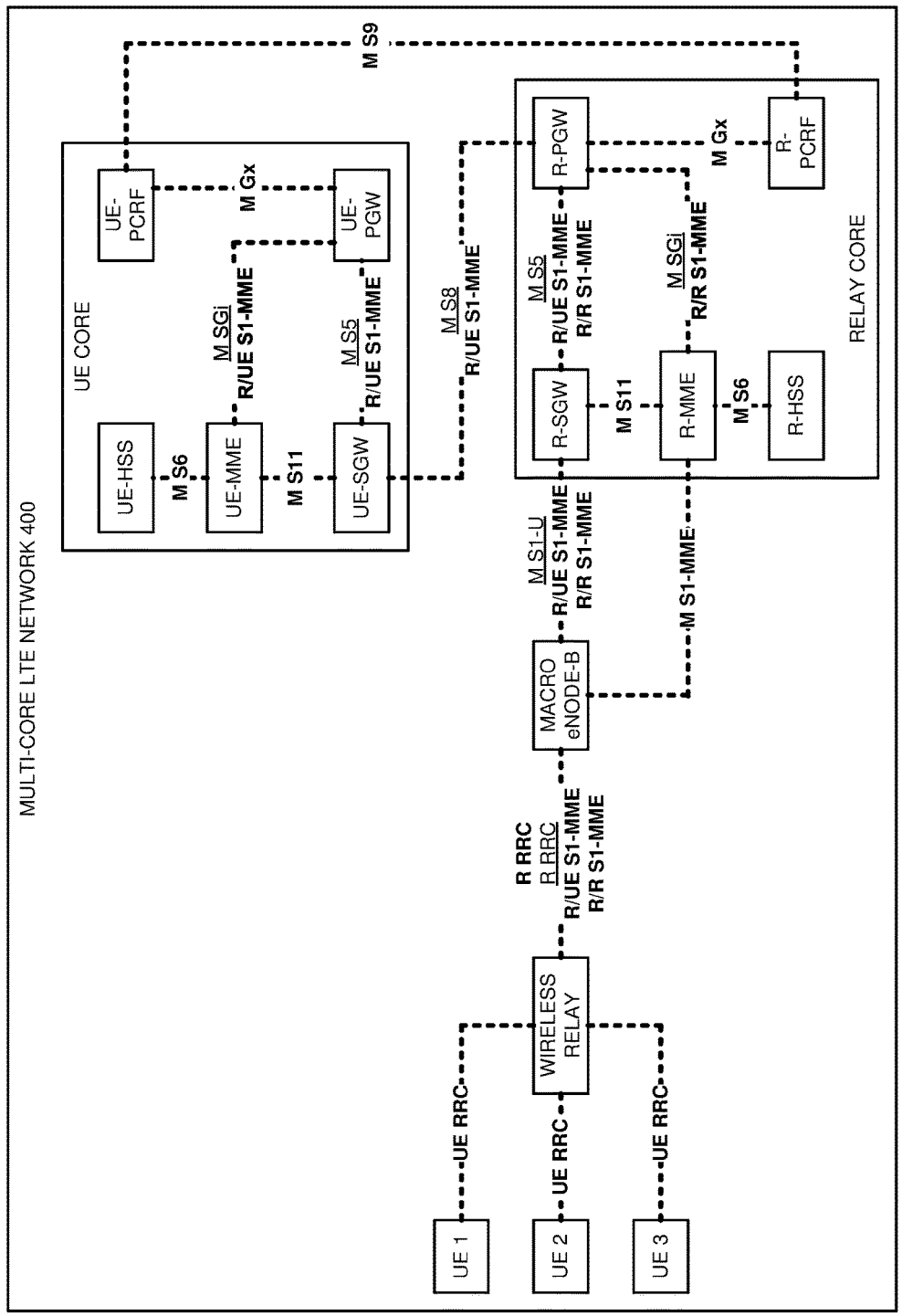
FIG. 4 illustrates signaling interfaces for a multi-core Long Term Evolution (LTE) Network that serves a wireless relay from a relay core and serves User Equipment (UEs) from a UE core.

FIGS. 4-9 illustrate multi-core Long Term Evolution (LTE) Network 400 to serve UEs 1-3 from a UE core over a relay core. FIG. 4 illustrates the signaling interfaces for LTE network 400. LTE Network 400 is an example of data communication system 100, although system 100 may use alternative configurations and operations. LTE network 400 comprises UEs 1-3, wireless relay, macro-eNodeB, relay core, and UE core. The relay core comprises: Relay Serving Gateway (R-SGW), Relay Mobility Management Entity (R-MME), Relay Home Subscriber System (R-HSS), Relay Packet Data Network Gateway (R-PGW), and Relay Policy Charging and Rules Function (R-PCRF). The UE core comprises: UE-SGW, UE-MME, UE-HSS, UE-PGW, and UE-PCRF.

UEs 1-3 and the wireless relay communicate over UE RRC signaling links. The wireless relay and the macro-eNodeB communicate over a Relay RRC (R RRC) data link that carries R/UE S1-MME and R/R S1-MME signaling links. The R RRC also exchanges signaling between the wireless relay and the macro eNodeB. The macro-eNodeB and the R-MME communicate over a Macro S1-MME (M S1-MME) signaling link. The macro-eNodeB and the R-SGW communicate over an M S1-U data link that carries the R/UE S1-MME and R/R S1-MME signaling links.

The R-SGW and the R-PGW communicate over an M S5 data link that transports the R/UE S1-MME and R/R S1-MME signaling links. The R-PGW and the R-MME communicate over an M SGi data link that carries the R/R S1-MME signaling link. The R-SGW and the R-MME communicate over an M S11 signaling link. The R-MME and the R-HSS communicate over an M S6 signaling link. The R-PGW and the R-PCRF communicate over an M Gx signaling link.

The UE-SGW and the UE-PGW communicate over an M S5 data link that transports the R/UE S1-MME signaling link. The UE-PGW and the UE-MME communicate over an M SGi data link that carries the R/UE S1-MME signaling link. The UE-SGW and the UE-MME communicate over an M S11 signaling link. The UE-MME and the UE-HSS communicate over an M S6 signaling link. The UE-PGW and the UE-PCRF communicate over an M Gx signaling link. The UE-PCRF and the R-PCRF communicate over an M S9 signaling link.

Figure 5:
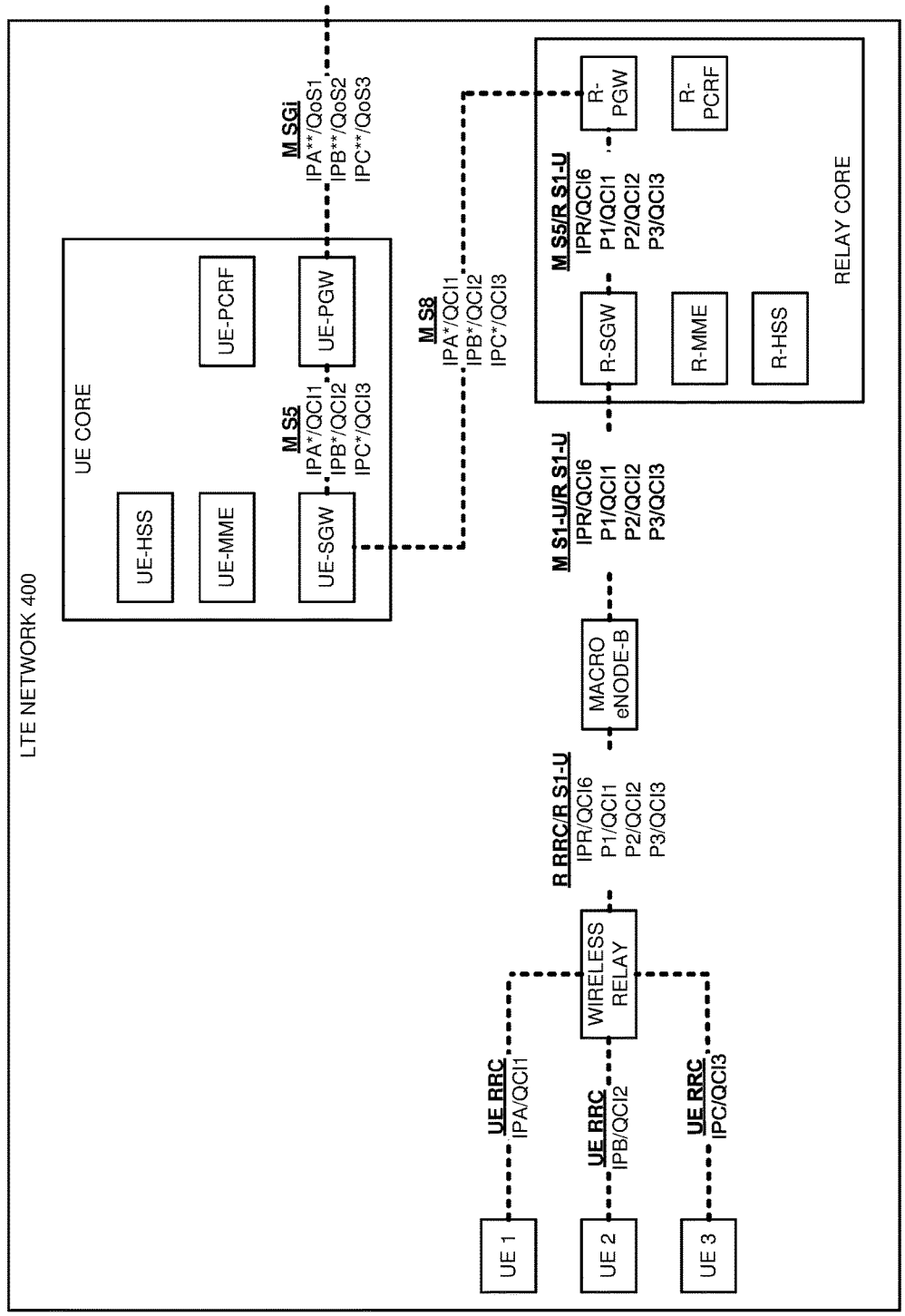
FIG. 5 illustrates user data interfaces and Internet Protocol (IP) addressing for the multi-core LTE Network.

FIG. 5 illustrates the user data links and an exemplary Internet Protocol addressing scheme for multi-core LTE network 400. UEs 1-3 and the wireless relay communicate over UE RRC data links. The UE bearers on these links use respective IP addresses A, B, and C along with corresponding QCIs 1, 2, and 3. Note that the QCIs are exemplary, and various QCI combinations could be used by UEs 1-3.

The wireless relay and the macro-eNodeB communicate over an R RRC data link that carries R S1-U user data. The R RRC link is the relay bearer and may use QCI6 or some other QoS. The UE bearers use the relay bearer on the R RRC data link. The wireless relay performs Network Address and Port Translation (NAPT) between IP addresses and IP ports. In the relay bearer, the UE bearers use the Relay IP address (IPR) and relay ports P1, P2, and P3 for respective UE IP addresses A, B, and C. P1, P2, and P3 for IPR use respective QCIs 1, 2, and 3.

The macro-eNodeB and the R-SGW communicate over an M S1-U data link that carries the R S1-U data link. The M S1-U link is the relay bearer and may use QCI6 or some other QoS. The UE bearers use the relay bearer on the M S1-U data link. The UE bearers use IPR, P1, P2, and P3 for respective UE IP addresses A, B, and C and use respective QCIs 1, 2, and 3. The R-SGW and the R-PGW communicate over an M S5 data link that transports the R S1-U data link. The UE bearers again use the QCI 6 relay bearer and again use IPR, P1, P2, and P3 for respective IP addresses A, B, and C and QCIs 1, 2, and 3.

The R-PGW and the UE-SGW communicate over an M S8 data link. The R-PGW also performs NAPT. Thus, the UE bearers on the M S8 data link use IP addresses A', B', and C' for respective IPR/P1, IPR/P2, and IPR/P3. IP address A', B', and C' use respective QCIs 1, 2, and 3. The UE-SGW and the UE-PGW communicate over an M S5 data link that uses IP addresses A', B', and C' and respective QCIs 1, 2, and 3. The UE-PGW and other systems communicate over M SGi data links. The UE-PGW performs NAPT. Thus, the UE bearers on the M SGi links use IP addresses A", B", and C" for IP addresses A', B', and C'. The UE bearers on the M SGi links use QoS 1, 2, and 3 that may correspond to QCIs 1, 2, and 3.

Figure 6:
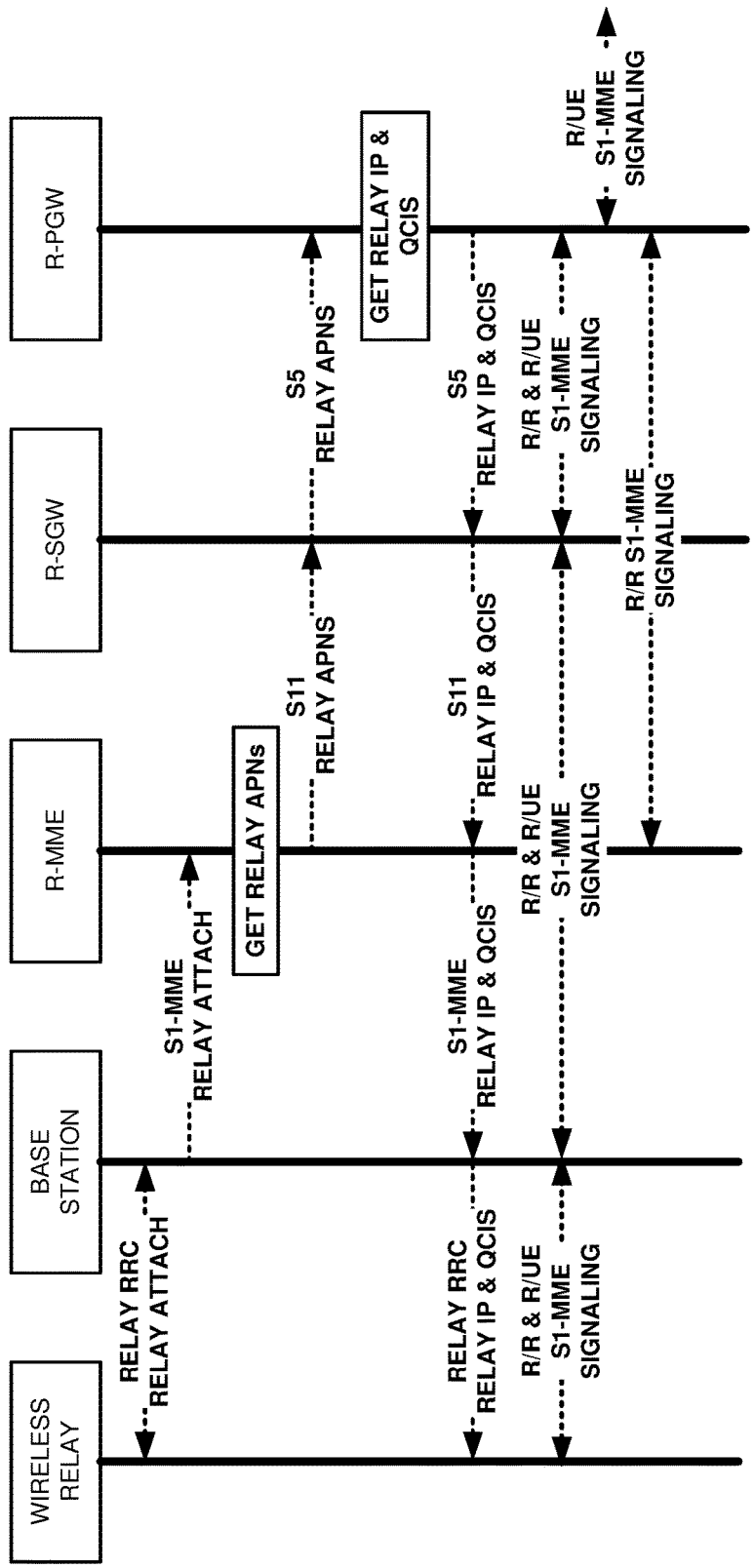
FIG. 6 illustrates wireless relay attachment in the multi-core LTE Network.

FIG. 6 illustrates wireless relay attachment in multi-core LTE Network 400. Initially, the wireless relay exchanges RRC attachment signaling with the wireless base station. The wireless base station responsively transfers an S1-MME attachment message to the R-MME. The R-MME accesses the R-HSS to authorize the wireless relay and get relay Access Point Names (APNs). The R-MME transfers an S11 session request with the relay APNs to the R-SGW, and the R-SGW sends an S5 session request with the relay APNs to the R-PGW.

The R-PGW accesses the R-PCRF to get relay QCIs for the relay APNs. Exemplary APNs and QCIs for the wireless relay might be APN DATA at QCI 6 and APN SIG at QCI 5. The R-PGW also issues an IP address (IPR) to the wireless relay. The R-PGW returns an S5 session response having the relay QCIs and IP address to the R-SGW. The R-SGW transfers an S11 session response having the relay QCIs and IP address to the R-MME. The R-MME transfers an S1-MME service response having the relay QCIs and IP address to the wireless base station. The wireless base station transfers an RRC service response having the relay QCIs and IP address to the wireless relay. The wireless relay may now exchange Relay-to-Relay core (R/R) S1-MME signaling with the R-MME. The wireless relay may also exchange Relay-to-UE core (R/UE) S1-MME signaling with the UE-MME.

Figure 7:
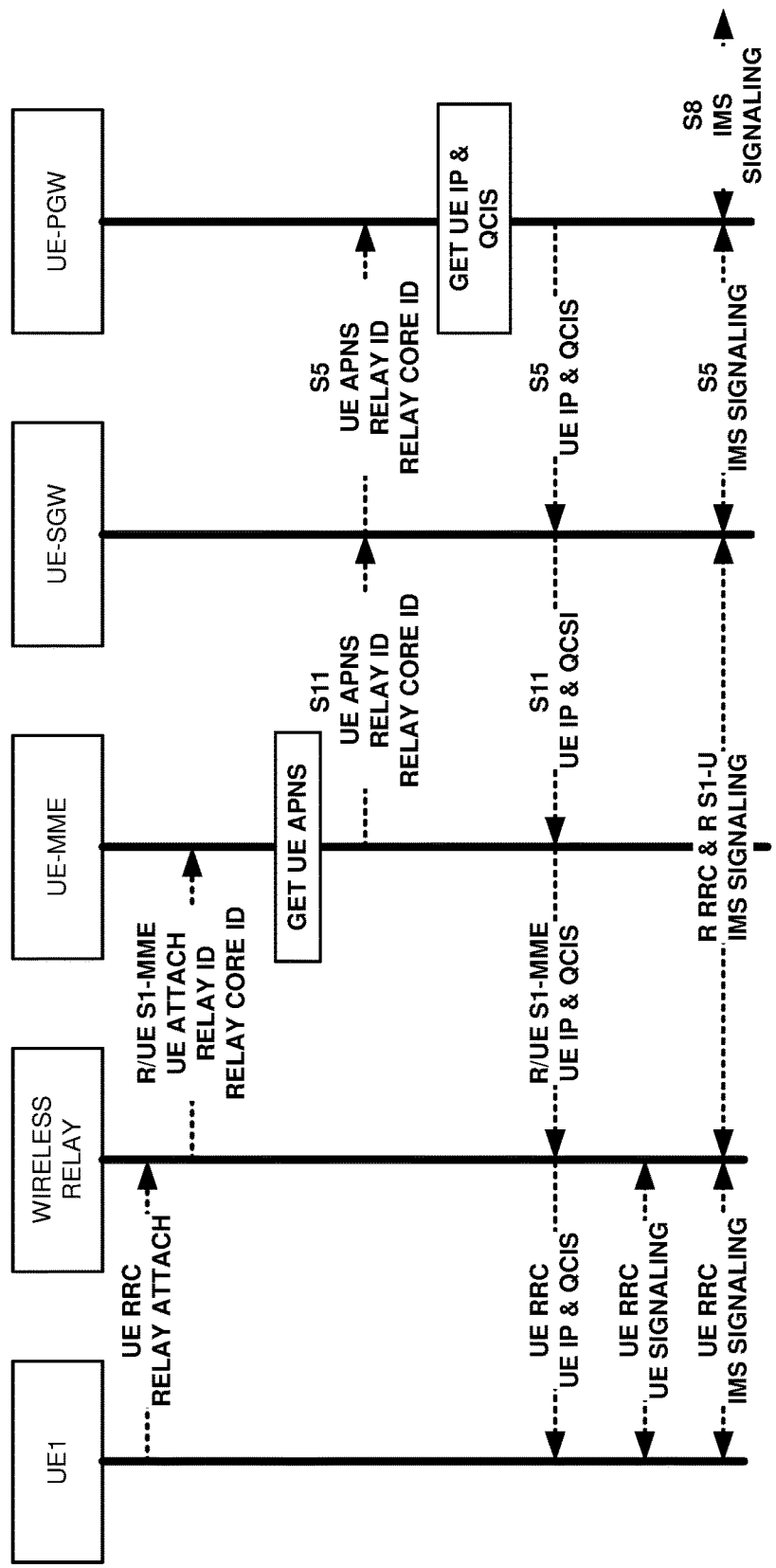
FIG. 7 illustrates wireless UE attachment in the multi-core LTE Network.

FIG. 7 illustrates wireless UE attachment in multi-core LTE Network 400. UE1 exchanges UE RRC attachment signaling with the wireless relay. The wireless relay responsively transfers an R/UE S1-MME attachment message having the UE ID, relay ID, and relay core ID to the UE-MME. The UE-MME accesses the UE-HSS to authorize UE1 and get UE APNs. The UE-MME transfers an S11 session request to the UE-SGW, and the UE-SGW sends an S5 session request to the UE-PGW. These S11 and S5 session requests include the UE APNs, UE ID, relay ID, and relay core ID.

The UE-PGW accesses the UE-PCRF to get UE QCIs for the UE APNs. Exemplary APNs and QCIs for UE1 might be APN DATA at QCI 9 and APN IMS at QCI 5. The UE-PGW also issues an IP address (IPA) to UE1. The UE-PGW returns an S5 session response having the UE QCIs and IP address to the UE-SGW. The UE-SGW transfers an S11 session response having the UE QCIs and IP address to the UE-MME. The UE-MME transfers an R/UE S1-MME service response having the UE QCIs and IP address to the wireless relay. The wireless relay transfers a UE RRC service response having the UE QCIs and IP address to UE1. UE1 may now exchange signaling with the wireless relay (and the wireless relay may exchange the R/UE S1-MME signaling for UE1 with the UE-MME). UE1 may also exchange signaling with external systems like an Internet Protocol Multimedia Subsystem (IMS) or the like.

Figure 8:
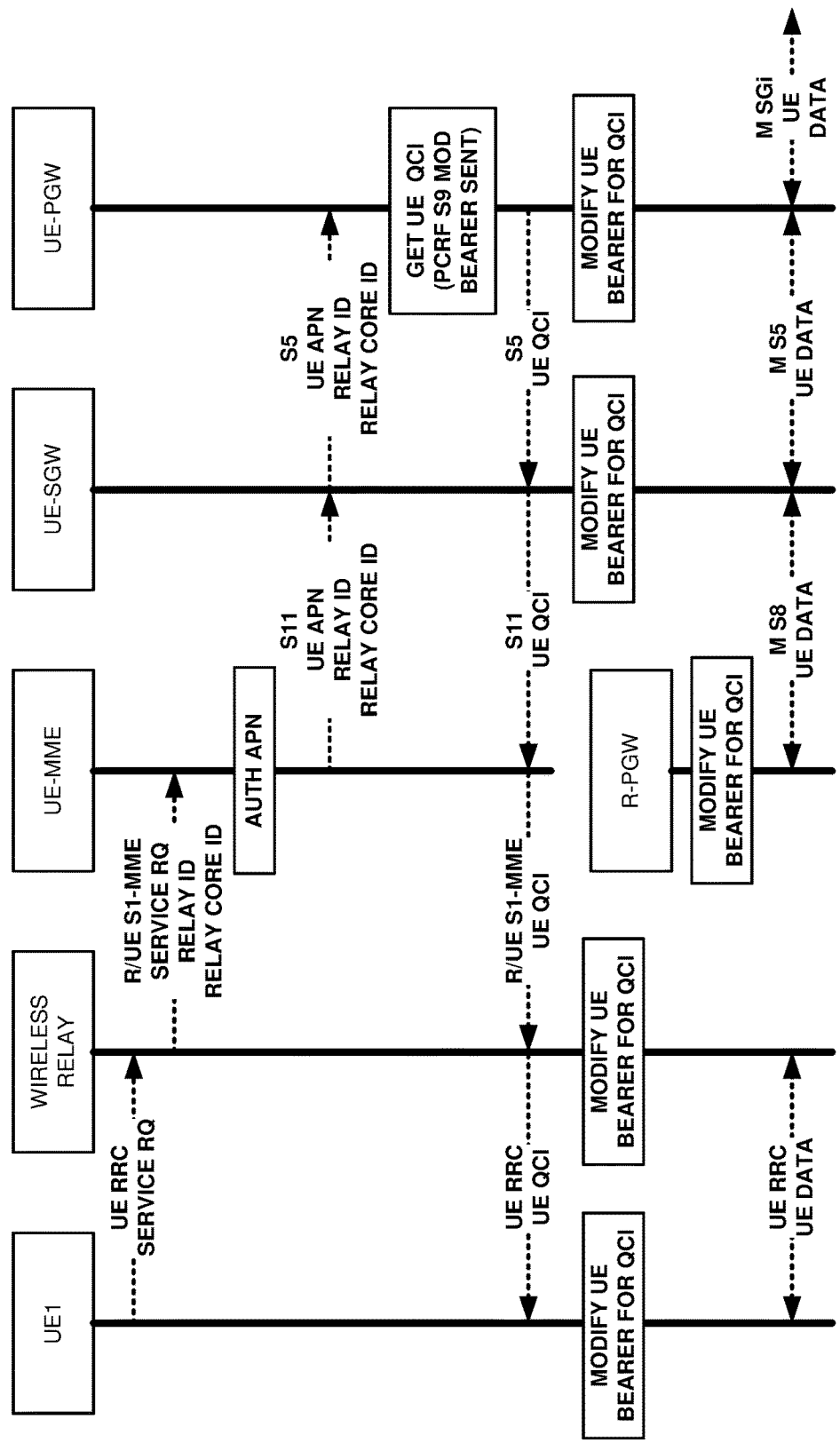
FIG. 8 illustrates a UE service request and UE bearer modification in the multi-core LTE Network.

FIG. 8 illustrates a UE service request and UE bearer modification in multi-core LTE Network 400. UE1 transfers a UE RRC service request to the wireless relay. For example, UE1 may be adding a voice, video, gaming, or other data bearer responsive to an IMS session. The wireless relay responsively transfers an R/UE S1-MME service request having the UE ID, UE APN, relay ID, and relay core ID to the UE-MME. The UE-MME accesses the UE-HSS to authorize the UE APN. The UE-MME then transfers an S11 session request to the UE-SGW, and the UE-SGW sends an S5 session request to the UE-PGW. These S11 and S5 session requests include the UE APN, UE ID, relay ID, and relay core ID.

The UE-PGW accesses the UE-PCRF to get the UE QCI for the UE APN. Exemplary APNs and QCIs for UE1 might be APN VOLTE at QCI 1 and APN VIDEO at QCI 2. The UE-PGW returns an S5 session response having the UE QCI to the UE-SGW. The UE-SGW transfers an S11 session response having the UE QCI to the UE-MME. Although not shown for clarity, the UE-MME returns an S11 modify bearer instruction having the UE QCI to the UE-SGW, and the UE-S-GW sends an S5 modify bearer request for the UE QCI to the UE-PGW. The UE-MME transfers an R/UE S1-MME service response having the UE QCI to the wireless relay. The wireless relay transfers a UE RRC service response having the UE QCI to UE1. In response to this message sequence, UE1, wireless relay, UE-SGW, and UE-PGW modify the UE bearer to support the UE QCI. The UE-SGW directs the R-PGW to modify the UE bearer.

When the UE-PGW accesses the UE-PCRF to get the UE QCI for the UE APN, the UE-PGW indicates the Relay ID and the Relay core ID through a Via Attribute Value Pair (AVP). Although note shown here for clarity, the UE-PCRF identifies the Via AVP and responsively transfers an S9 message to the R-PCRF that indicates the Relay ID, UE ID, UE APN, and UE QCI. The R-PCRF directs the R-PGW to modify the relay bearer based on the Relay ID, UE ID, UE APN, and UE QCI. This operational sequence is described further below.

UE1 may now exchange UE RRC user data with the wireless relay using the UE QCI. The R-PGW exchanges the user data using the UE QCI over the M S8 data link with the UE-SGW. The UE-SGW exchanges the user data using the QCI over the M S5 data link with the UE-PGW. The UE-PGW exchanges the user data using a QCI-like QoS over the M SGi data link to another system.

Figure 9:
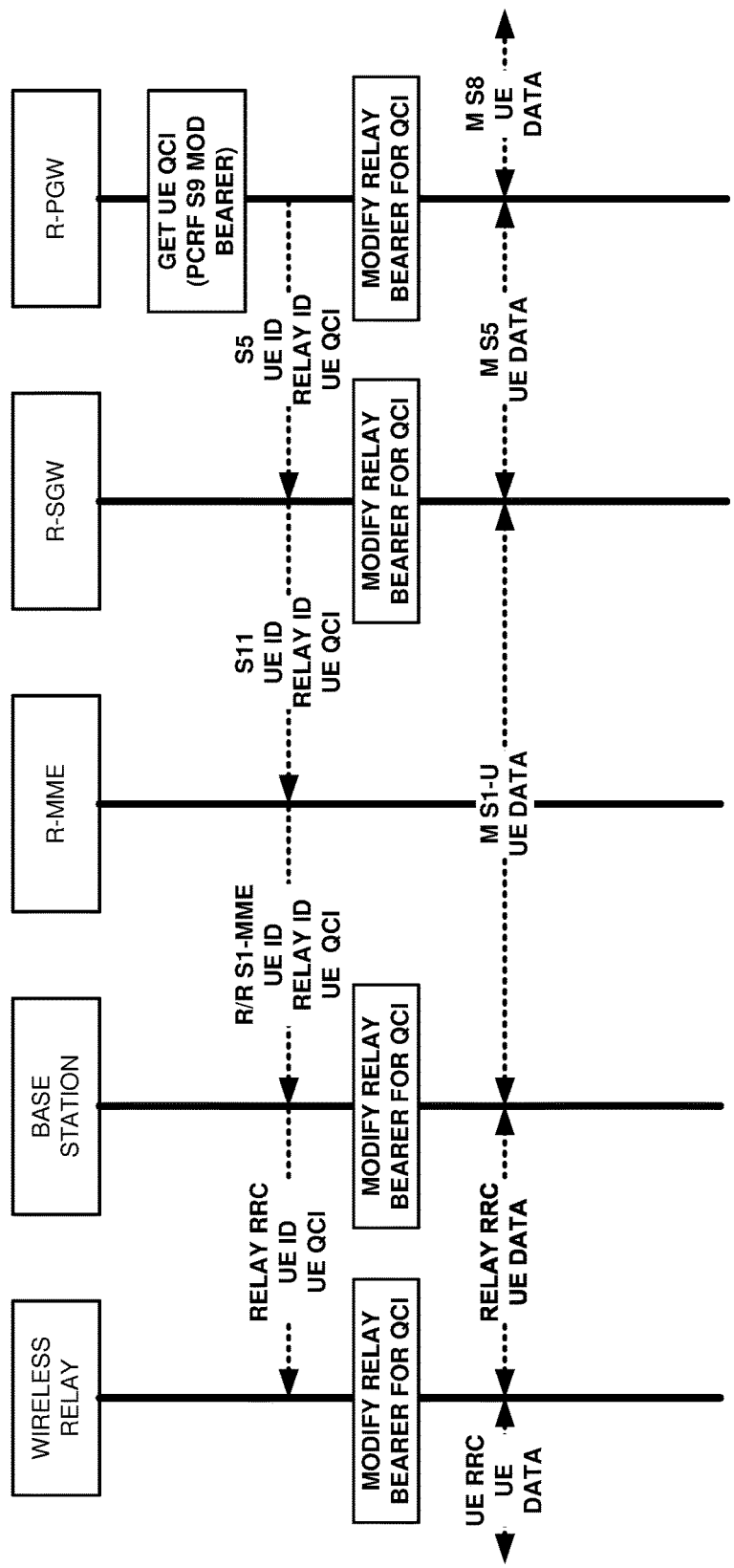
FIG. 9 illustrates the UE service request and relay bearer modification in the multi-core LTE Network.

FIG. 9 illustrates the UE service request and relay bearer modification in multi-core LTE Network 400. Although note shown here for clarity, the UE-PCRF previously identified the relay ID and relay core ID and responsively sent the S9 message to the R-PCRF that indicated the Relay ID, UE ID, UE APN, and UE QCI. The R-PCRF then directed the R-PGW to modify the relay bearer based on the Relay ID, UE ID, and UE QCI.

The R-PGW sends an S5 modify bearer request having the UE ID, Relay ID, and UE QCI to the R-SGW. The R-SGW transfers an S11 modify bearer request having the UE ID, Relay ID, and UE QCI to the R-MME. The R-MME transfers an R/R S1-MME service response having the Relay ID, UE ID, and UE QCI to the wireless base station. The wireless base station transfers a Relay RRC modify bearer request having the UE ID and UE QCI to the wireless relay. Although note shown here for clarity, the R-MME also returns an S11 modify bearer instruction having the UE QCI to the R-SGW, and the UE-S-GW sends an S5 modify bearer request for the UE QCI to the UE-PGW. In response to this message sequence, the wireless relay, wireless base station, R-SGW, and R-PGW modify the relay bearer to support the UE QCI.

The wireless relay now exchanges user data with UE1 using the UE QCI. The wireless relay and the wireless base station exchange the user data using the UE QCI over the R RRC data link. The wireless base station and the R-SGW exchange the user data using the UE QCI over the M S1-U data link. The R-SGW and the R-PGW exchange the user data using the UE QCI over the M S5 data link. The R-PGW and the UE-SGW exchange the user data using the UE QCI over the M S8 data link. The user data exchange through the UE core is described above.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a multi-core data communication system to serve a wireless relay from a relay core system and to serve User Equipment (UE) from a UE core system, the method comprising:
   the relay core system establishing a relay bearer between the wireless relay and the relay core system over a wireless base station;
   the wireless relay receiving a wireless data request from the UE and responsively transferring an S1-MME UE data request for delivery to the UE core system and indicating a UE Identifier (ID), a Relay ID, and a Relay Core ID;
   a UE Mobility Management Entity (UE-MME) in the UE core system receiving the S1-MME data request having the relay ID and the relay core ID and the UE core system responsively transferring a core-to-core message indicating the Relay ID for delivery to the relay core system;
   the relay core system receiving the core-to-core message and responsively transferring a base station message directing the wireless base station to modify the relay bearer;
   the UE MME in the UE core system responsively transferring an S11 bearer request having the relay ID and the relay core ID to a UE Serving Gateway (UE-SGW) in response to the S1-MME data request;
   the UE-SGW receiving the S11 bearer request and responsively transferring an S5 bearer request having the relay ID and the relay core ID to a UE Packet Data Network Gateway (UE-PGW);
   the UE-PGW receiving the S5 bearer request and responsively transferring a Gx bearer request having the relay ID and the relay core ID to a UE Policy Charging and Rules Function (UE-PCRF); and
   the wireless relay exchanging wireless data with the UE over a UE bearer, the wireless relay and the wireless base station exchanging the user data over the UE bearer, the wireless base station and the relay core system exchanging the user data over the UE bearer, and the relay core system and the UE core system exchanging the user data over the UE bearer, wherein the UE bearer traverses the modified relay bearer between the wireless relay and the relay core system.

2. The method of claim 1 further comprising:
   the wireless relay attaching to the relay core system over the wireless base station; and wherein the relay core system establishing the relay bearer comprises the relay core system establishing the relay bearer in response to the wireless relay attachment.

3. The method of claim 1 further comprising:
the wireless relay exchanging Radio Resource Control (RRC) attachment signaling with the wireless base station and the wireless base station responsively transferring an S1-MME attachment message to a Relay Mobility Management Entity (R-MME);
the R-MME receiving the S1-MME attachment message and responsively transferring an S11 session request to a Relay Serving Gateway (R-SGW);
the R-SGW receiving the S11 bearer request and responsively transferring an S5 session request to a Relay Packet Data Network Gateway (R-PGW); and
the R-PGW receiving the S5 bearer request and responsively transferring a Gx session request to a Relay Policy Charging and Rules Function (R-PCRF);
the R-PCRF receiving the Gx session request and responsively transferring a Gx session response to the R-PGW;
the R-PGW receiving the Gx session response and responsively transferring an S5 session response to the R-SGW; and
the R-SGW receiving the S5 session response and responsively transferring an S11 session response to the R-MME.

4. The method of claim 1 further comprising:
the wireless relay exchanging wireless attachment signals with the wireless UE and responsively transferring the S1-MME UE data request for delivery to the UE core system indicating the UE ID, the Relay ID, and the Relay Core ID.

5. The method of claim 1 further comprising:
the UE-PCRF receiving the Gx session request and responsively transferring a Gx session response to the UE-PGW indicating the UE ID, the Relay ID, and the Relay Core ID;
the UE-PGW receiving the Gx session response and responsively transferring an S5 session response to the UE-SGW indicating the UE ID, the Relay ID, and the Relay Core ID; and
the UE-SGW receiving the S5 bearer response and responsively transferring an S11 session response to the UE-MME indicating the UE ID, the Relay ID, and the Relay Core ID.

6. The method of claim 1 wherein the UE core system transferring the core-to-core message indicating the Relay ID to the relay core system comprises the UE PCRF processing the Gx bearer request having the relay ID and the relay core ID and responsively transferring an S9 bearer request having the relay ID for delivery to a Relay PCRF (R-PCRF) in the relay core system.

7. The method of claim 1 wherein the UE core system transferring the core-to-core message indicating the Relay ID to the relay core system further comprises the UE PCRF determining a Quality-of-Service Class Identifier (QCI) for the relay bearer and transferring the QCI to a Relay PCRF (R-PCRF) in the relay core system.

8. The method of claim 1 wherein the relay core system exchanging the user data with the UE core system comprises, in the UE core system:
the UE PCRF transferring a Gx bearer response having the relay ID and the relay core ID to the UE P-GW;
the UE-PGW receiving the Gx bearer response and responsively transferring an S5 bearer response to the UE S-GW;
the UE-SGW receiving the S5 bearer response and responsively transferring an S11 bearer response to the UE MME;
the UE-MME receiving the S11 bearer response and responsively transferring an S11 modify bearer request to the UE-SGW; and
the UE-SGW receiving the S11 modify bearer request and responsively exchanging the user data with a Relay PGW (R-PGW) over an S8 bearer and exchanging the user data with the UE-PGW over an S5 bearer.

9. The method of claim 1 wherein the relay core system exchanging the user data with the UE core system comprises, in the relay core system:
a Relay Policy Charging and Rules Function (R-PCRF) transferring a Gx bearer request having the relay ID to a Relay Packet Data Network Gateway (R-PGW);
the R-PGW receiving the Gx bearer request and responsively transferring an S5 bearer request to a Relay Serving Gateway (R-SGW);
the R-SGW receiving the S5 bearer request and responsively transferring an S11 bearer request to a Relay Mobility Management Entity (R-MME);
the R-MME receiving the S11 bearer request and responsively transferring an S1-MME modify bearer request to the wireless base station and transferring an S11 modify bearer request to the R-SGW;
the wireless base station receiving the S1-MME modify bearer request and responsively exchanging the user data with the wireless relay over a Radio Resource control (RRC) bearer and exchanging the user data with the R-SGW over an S1-U bearer; and
the R-SGW receiving the S11 modify bearer request and responsively exchanging the user data with the wireless base station over the S1-U bearer and exchanging the user data with the R-PGW over an S5 bearer.

10. A multi-core data communication system to serve a wireless relay from a relay core system and to serve User Equipment (UE) from a UE core system, the multi-core data communication system comprising:
the relay core system configured to establish a relay bearer between the wireless relay and the relay core system over a wireless base station;
the wireless relay configured to receive a wireless data request from the UE and responsively transfer an S1-MME UE data request for delivery to a UE Mobility Management Entity (UE-MME) in the UE core system and indicating a UE Identifier (ID), a Relay ID, and a Relay Core ID;
the UE core system configured to receive the S1-MME data request and responsively transfer a core-to-core message indicating the Relay ID for delivery to the relay core system;
the relay core system configured to receive the core-to-core message and responsively transfer a base station message directing the wireless base station to modify the relay bearer;
the UE MME in the UE core system configured to responsively transfer an S11 bearer request having the relay ID and the relay core ID to a UE Serving Gateway (UE-SGW) in response to the S1-MME data request;
the UE-SGW configured to receive the S11 bearer request and responsively transfer an S5 bearer request having the relay ID and the relay core ID to a UE Packet Data Network Gateway (UE-PGW);
the UE-PGW configured to receive the S5 bearer request and responsively transfer a Gx bearer request having the relay ID and the relay core ID to a UE Policy Charging and Rules Function (UE-PCRF); and the wireless relay configured to exchange wireless data with the UE over a UE bearer, the wireless relay and the wireless base station configured to exchange the user data over the UE bearer, the wireless base station and the relay core system configured to exchange the user data over the UE bearer, and the relay core system and the UE core system configured to exchange the user data over the UE bearer, wherein the UE bearer traverses the modified relay bearer between the wireless relay and the relay core system.

11. The multi-core data communication network of claim 10 further comprising:

the wireless relay configured to attach to the relay core system over the wireless base station; and wherein the relay core system establishes the relay bearer in response to the wireless relay attachment.

12. The multi-core data communication network of claim 10 further comprising:

the wireless relay configured to exchange Radio Resource Control (RRC) attachment signaling with the wireless base station and the wireless base station responsively configured to transfer an S1-MME attachment message to a Relay Mobility Management Entity (R-MME);

the R-MME configured to receive the S1-MME attachment message and responsively transfer an S11 session request to a Relay Serving Gateway (R-SGW);

the R-SGW configured to receive the S11 bearer request and responsively transfer an S5 session request to a Relay Packet Data Network Gateway (R-PGW); and the R-PGW configured to receive the S5 bearer request and responsively transfer a Gx session request to a Relay Policy Charging and Rules Function (R-PCRF);

the R-PCRF configured to receive the Gx session request and responsively transfer a Gx session response to the R-PGW;

the R-PGW configured to receive the Gx session response and responsively transfer an S5 session response to the R-SGW; and the R-SGW configured to receive the S5 session response and responsively transfer an S11 session response to the R-MME.

13. The multi-core data communication network of claim 10 further comprising:

the wireless relay configured to exchange the S1-MME UE data request with the wireless UE and responsively transfer a wireless attachment message for delivery to the UE core system indicating the UE ID, the Relay ID, and the Relay Core ID.

14. The multi-core data communication network of claim 10 further comprising:

the UE-PCRF configured to receive the Gx session request and responsively transfer a Gx session response to the UE-PGW indicating the UE ID, the Relay ID, and the Relay Core ID;

the UE-PGW configured to receive the Gx session response and responsively transfer an S5 session response to the UE-SGW indicating the UE ID, the Relay ID, and the Relay Core ID; and the UE-SGW configured to receive the S5 bearer response and responsively transfer an S11 session response to the UE-MME indicating the UE ID, the Relay ID, and the Relay Core ID.

15. The multi-core data communication network of claim 10 further comprising the UE PCRF configured to process the Gx bearer request having the relay ID and the relay core ID and responsively transfer an S9 bearer request having the relay ID for delivery to a Relay PCRF (R-PCRF) in the relay core system.

16. The multi-core data communication network of claim 10 further comprising the UE PCRF configured to determine a Quality-of-Service Class Identifier (QCI) for the relay bearer and transfer the QCI to a Relay PCRF (R-PCRF) in the relay core system.

17. The multi-core data communication network of claim 10 further comprising:

the UE PCRF configured to transfer a Gx bearer response having the relay ID and the relay core ID to the UE P-GW;

the UE-PGW configured to receive the Gx bearer response and responsively transfer an S5 bearer response to the UE S-GW;

the UE-SGW configured to receive the S5 bearer response and responsively transfer an S11 bearer response to the UE MME;

the UE-MME configured to receive the S11 bearer response and responsively transfer an S11 modify bearer request to the UE-SGW; and the UE-SGW configured to receive the S11 modify bearer request and responsively exchange the user data with a Relay PGW (R-PGW) over an S8 bearer and exchange the user data with the UE-PGW over an S5 bearer.

18. The multi-core data communication network of claim 10 further comprising:

a Relay Policy Charging and Rules Function (R-PCRF) configured to transfer a Gx bearer request having the relay ID to a Relay Packet Data Network Gateway (R-PGW);

the R-PGW configured to receive the Gx bearer request and responsively transfer an S5 bearer request to a Relay Serving Gateway (R-SGW);

the R-SGW configured to receive the S5 bearer request and responsively transfer an S11 bearer request to a Relay Mobility Management Entity (R-MME);

the R-MME configured to receive the S11 bearer request and responsively transfer an S1-MME modify bearer request to the wireless base station and transfer an S11 modify bearer request to the R-SGW;

the wireless base station configured to receive the S1-MME modify bearer request and responsively exchange the user data with the wireless relay over a Radio Resource control (RRC) bearer and exchange the user data with the R-SGW over an S1-U bearer; and the R-SGW configured to receive the S11 modify bearer request and responsively exchange the user data with the wireless base station over the S1-U bearer and exchange the user data with the R-PGW over an S5 bearer.

* * * * *